UNITED STATES PATENT OFFICE.

ERNEST KELLER, OF NEW YORK, N. Y.

MANUFACTURING WINE.

SPECIFICATION forming part of Letters Patent No. 639,398, dated December 19, 1899.

Application filed July 1, 1899. Serial No. 722,585. (No specimens.)

*To all whom it may concern:*

Be it known that I, ERNEST KELLER, a citizen of the United States, residing at New York, (Manhattan,) in the county and State of New York, have invented new and useful Improvements in Manufacturing Wine, of which the following is a specification.

By means of this invention unfermented and non-alcoholic wine can be produced from raisins. The manufacture can thus be carried on at any period or season of the year and can also be carried on cheaply and yield a healthy and strengthening beverage.

The following process has been found to give satisfactory results, using the hereinafter-named quantities or proportions of material, times, and temperatures, although, of course, slight variations are possible, and the invention is not to be confined to the exact figures given.

The raisins are first washed twice in cold water, or water at the temperature of the air, and freed from poor, spoiled, or defective fruit and from other foreign matter, such as stems. Then for one hundred pounds raisins allow fifteen gallons water. The raisins are put in a kettle or vessel, which was well tinned, and sufficient of the fifteen gallons water added to just cover the raisins. The vessel or cylinder is then hermetically closed and placed in a water-bath or into a second vessel or cylinder containing water and heated by direct application of flame to the outer vessel or by steam. The heating is continued until the thermometer shows a temperature of between 133° and 134° Fahrenheit for the inner vessel. This temperature is kept up for six hours. The inner vessel is now taken out and cooled or refrigerated to about from 50° to 54° Fahrenheit. A mixture of water and ice in a suitable receptacle serves as a refrigerator. The raisins have now swelled, and the remaining water or liquid is poured off or decanted and the raisins put in a grape mill or press and pressed. After the pressing is completed the pressed massed is a second time placed into such inner or tinned vessel, together with the poured off or decanted water and the remainder of the fifteen gallons above named, and again heated. This second heating is raised to 212° Fahrenheit—in other words, to boiling-point—and when this temperature is reached the inner vessel is removed, cooled as before, and the contents pressed a second time. The wine or juice resulting from both pressures is mixed and at once sterilized, which can be effected in the same inner or tinned vessel by warming to 156° Fahrenheit and remaining exposed to such degree of heat for twenty minutes. The wine is then again cooled and removed to the cellar or vault into vats provided therefor. These vats must be thoroughly clean or free from germs or fungus as well inside as outside. After the wine is drawn into these vats the latter are tightly closed. The wine is now allowed to settle or clarify and is then filtered or drawn through a suitable filtering apparatus into bottles or barrels and is now ready for the market.

The wine or juice resulting from both pressures when mixed forms a beverage ready for immediate consumption without having been sterilized or otherwise treated; but if to be kept a certain period before consumption or on the market the advisability of sterilizing, clarifying, and filtering is manifest.

With regard to the heating of the raisins in water it should be noted that this step serves for restoring to the raisins the water which was lost by drying. The subsequent refrigerating or cooling prevents fermentation. If the mass were treated or worked without cooling, fermentation would ensue and the object of obtaining a non-alcoholic beverage would be defeated. By working at low temperature fermentation is avoided. By heating the pressed mass with water the saccharine matter is thoroughly dissolved. At ordinary temperature such dissolution would be slow, if not incomplete. The subsequent cooling has the same object as the former cooling, as the juice must not be exposed to the air at high temperature, as the sugar would then begin to ferment.

What I claim as new, and desire to secure by Letters Patent, is—

1. The process herein described for producing wine from raisins which consists in heating raisins with water, refrigerating or cooling, pressing, heating the pressed mass with water, and again pressing and mixing the juice or liquid resulting from both pressures substantially as described.

2. The process of treating raisins which consists in heating raisins with water, refrigerating or cooling, pressing, heating the pressed mass with a further quantity of water, again pressing, sterilizing the resulting wine or liquid from both pressures, and cooling and filtering the same substantially as described.

3. The process of heating raisins with water, cooling, pouring off the water, pressing the raisins, heating the pressed mass with water to boiling-point, again pressing, sterilizing the wine or juice resulting from both pressings, and cooling, clarifying and filtering the same substantially as described.

In testimony whereof I have hereunto set my hand in the presence of two subscribing witnesses.

ERNEST KELLER.

Witnesses:
W. C. HAUFF,
E. F. KASTENHUBER.